US012647625B2

(12) United States Patent
Li et al.

(10) Patent No.: US 12,647,625 B2
(45) Date of Patent: Jun. 2, 2026

(54) INFORMATION SENDING METHOD, ELECTRONIC DEVICE, AND NON-TRANSITORY COMPUTER-READABLE STORAGE MEDIUM

(71) Applicant: Beijing Bytedance Network Technology Co., Ltd., Beijing (CN)

(72) Inventors: Linxing Li, Beijing (CN); Xuyuan Xiang, Beijing (CN); Chengchen Rao, Beijing (CN); Fei Zhao, Beijing (CN); Panjie Wu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 30 days.

(21) Appl. No.: 18/550,216

(22) PCT Filed: Mar. 3, 2022

(86) PCT No.: PCT/CN2022/079003
§ 371 (c)(1),
(2) Date: Sep. 12, 2023

(87) PCT Pub. No.: WO2022/188688
PCT Pub. Date: Sep. 15, 2022

(65) Prior Publication Data
US 2024/0163490 A1      May 16, 2024

(30) Foreign Application Priority Data
Mar. 12, 2021    (CN) .......................... 202110270460.6

(51) Int. Cl.
*H04N 21/2187*      (2011.01)
*H04N 21/43*        (2011.01)
(Continued)

(52) U.S. Cl.
CPC ... *H04N 21/2187* (2013.01); *H04N 21/43074* (2020.08); *H04N 21/4334* (2013.01); *H04N 21/4788* (2013.01); *H04N 21/8547* (2013.01)

(58) Field of Classification Search
CPC ......... H04N 21/2187; H04N 21/43074; H04N 21/4334; H04N 21/4788; H04N 21/8547
See application file for complete search history.

(56) References Cited

U.S. PATENT DOCUMENTS

| | | | |
|---|---|---|---|
| 2014/0123014 A1* | 5/2014 | Keen ..................... | H04L 51/046 |
| | | | 715/719 |
| 2014/0255002 A1* | 9/2014 | Baldwin ............ | H04N 21/4788 |
| | | | 386/239 |

(Continued)

FOREIGN PATENT DOCUMENTS

| | | |
|---|---|---|
| CN | 103634681 A | 3/2014 |
| CN | 104618806 A | 5/2015 |

(Continued)

OTHER PUBLICATIONS

International Preliminary Report issued Sep. 12, 2023 in PCT/CN2022/079003, English translation (7 pages).

(Continued)

*Primary Examiner* — Nnenna N Ekpo

(57) ABSTRACT

The present disclosure discloses an information sending method, electronic device and non-transitory computer-readable storage medium. The information sending method includes: sending a live video stream to a first set of clients; receiving first information sent from the first set of clients; recording a timestamp of the first information; sending the first information to the first set of clients; generating a recorded video stream of the live video stream, in response to completion of the sending of the live video stream; synchronizing the timestamp of the first information with the recorded video stream to obtain a playback timeline of the (Continued)

first information; sending the recorded video stream to the second set of clients, and sending the first information according to the play timeline of the first information; receiving second information sent from the second set of clients; and sending the second information to the second set of clients.

11 Claims, 4 Drawing Sheets

(51) Int. Cl.
    *H04N 21/433*     (2011.01)
    *H04N 21/4788*    (2011.01)
    *H04N 21/8547*    (2011.01)

(56) References Cited

U.S. PATENT DOCUMENTS

| | | | |
|---|---|---|---|
| 2018/0176276 A1* | 6/2018 | Gandhi | .................. H04L 65/80 |
| 2020/0336769 A1 | 10/2020 | Li et al. | |
| 2022/0167036 A1 | 5/2022 | Lin | |

FOREIGN PATENT DOCUMENTS

| | | | |
|---|---|---|---|
| CN | 105100933 A | 11/2015 |
| CN | 105117934 A | 12/2015 |
| CN | 105872582 A | 8/2016 |
| CN | 105915931 A | 8/2016 |
| CN | 106303658 A | 1/2017 |
| CN | 108668158 A | 10/2018 |
| CN | 111954077 A | 11/2020 |
| WO | 2020200302 A1 | 10/2020 |

OTHER PUBLICATIONS

International Search Report issued Jun. 9, 2022 in PCT/CN2022/079003, English translation (6 pages).
Written Opinion for International Application No. PCT/CN2022/079003, mailed Jun. 9, 2022, 06 Pages.

* cited by examiner

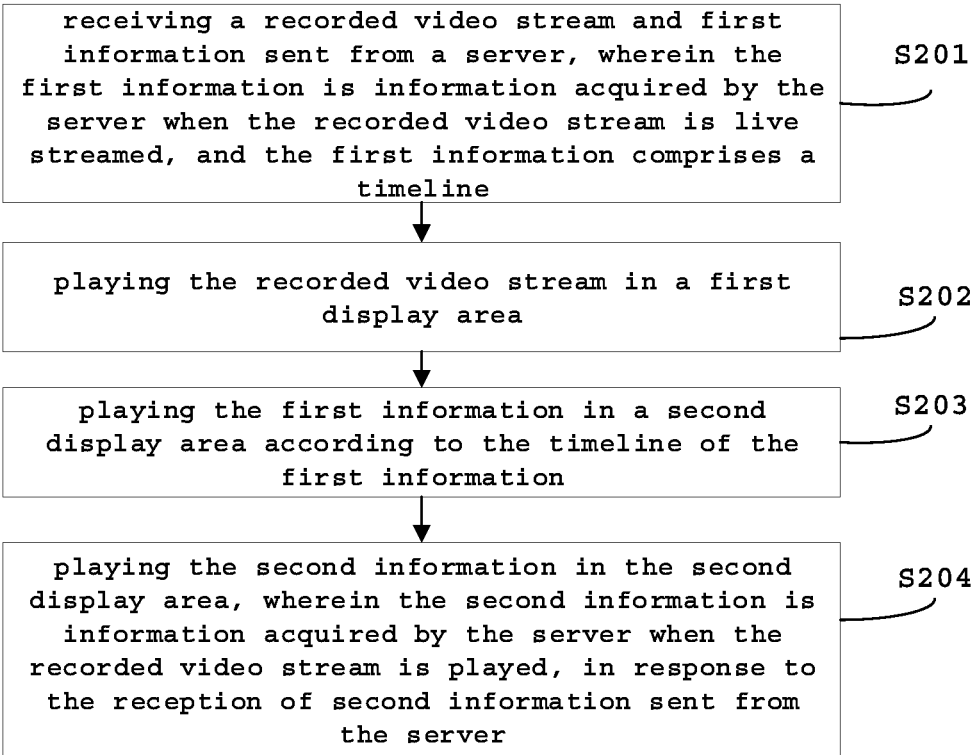

receiving a recorded video stream and first
information sent from a server, wherein the
first information is information acquired by the
server when the recorded video stream is live
streamed, and the first information comprises a
timeline

S201 playing the recorded video stream in a first
display area

S202 playing the first information in a second
display area according to the timeline of the
first information

S203 playing the second information in the second
display area, wherein the second information is
information acquired by the server when the
recorded video stream is played, in response to
the reception of second information sent from
the server

INFORMATION SENDING METHOD, ELECTRONIC DEVICE, AND NON-TRANSITORY COMPUTER-READABLE STORAGE MEDIUM

CROSS-REFERENCE TO RELATED APPLICATIONS

The present disclosure is a U.S. National Stage Application under 35 U.S.C. § 371 of International Patent Application No. PCT/CN2022/079003, filed on Mar. 3, 2022, which is based on and claims the priority to the Chinese patent application No. 202110270460.6 filed on Mar. 12, 2021, the disclosure of both of which are hereby incorporated by reference in their entireties into the present application.

TECHNICAL FIELD

The present disclosure relates to the field of information processing, and in particular, to an information sending method, apparatus, electronic device and computer-readable storage medium.

BACKGROUND

With the progress of network technology and encoding and decoding technology, there comes rapid growth in a media content distribution market based on audio and video, so that a user can, through a terminal device, obtain various media contents anytime and anywhere.

At present, an existing product on the market, for bullet screen text, has a function of playing bullet screen interactions only under a recording and broadcasting scenario, to record processing on text, interaction information sent by a current user.

SUMMARY

This "SUMMARY" is provided to introduce concepts in a simplified form, which will be described in detail below in the following "DETAILED DESCRIPTION". The "SUMMARY" is not intended to identify key features or essential features of the claimed technical solutions, nor is it intended to limit the scope of the claimed technical solutions.

In a first aspect, some embodiments of the present disclosure provide an information sending method, comprising:

sending a live video stream to a first set of clients;

receiving first information sent from the first set of clients, wherein the first information is information related to the live video stream received during the sending of the live video stream;

recording a timestamp of the first information;

sending the first information to the first set of clients;

generating a recorded video stream of the live video stream, in response to the completion of the sending of the live video stream;

synchronizing the timestamp of the first information with the recorded video stream to obtain a play timeline of the first information;

in response to reception of a request for the recorded video stream of a second set of clients, sending the recorded video stream to the second set of clients, and sending the first information according to the play timeline of the first information;

receiving second information sent from the second set of clients, wherein the second information is information related to the recorded video stream received during the sending of the recorded video stream; and sending the second information to the second set of clients.

Further, the first set of clients is overlapped, or not overlapped, or partially overlapped with the second set of clients.

Further, the first information comprises: bullet screen information and/or comment information sent from the first set of clients, received during the sending of the live video stream.

Further, the second information comprises: bullet screen information and/or comment information sent from the second set of clients, received during the sending of the recorded video stream.

Further, the generating a recorded video stream of the live video stream comprises, in response to the completion of the sending of the live video stream: in response to the completion of sending a last video frame of the live video stream, generating the recorded video stream of the live video stream, wherein each video frame in the recorded video stream carries a timestamp, which represents time when the video frame is generated.

Further, the synchronizing the timestamp of the first information with the recorded video stream to obtain a play timeline of the first information comprises: synchronizing the first information with the recorded video stream according to the timestamp of the first information and the timestamp of the video frame of the recorded video stream to obtain a playing time point of the first information relative to the recorded video stream.

Further, the synchronizing the first information with the recorded video stream according to the timestamp of the first information and the timestamp of the video frame of the recorded video stream to obtain a playing time point of the first information relative to the recorded video stream comprises: calculating a time difference between the timestamp of the first information and a timestamp of a first video frame of the recorded video stream, as the playing time point of the first information relative to the recorded video stream.

Further, the sending the first information according to the play timeline of the first information comprises:

calculating sending time of the first information according to sending time of the first video frame of the recorded video stream and the playing time point of the first information; and sending the first information, till the sending time is reached.

Further, the sending the first information according to the play timeline of the first information comprises: determining first information corresponding to the video frame of the recorded video stream; and while sending the video frame to the second set of clients, sending the first information to the second set of clients.

In a second aspect, some embodiments of the present disclosure provide an information display method, comprising:

receiving a recorded video stream and first information sent from a server, wherein the first information is information acquired by the server when the recorded video stream is live streamed, and the first information comprises a timeline;

playing the recorded video stream in a first display area;

playing the first information in a second display area according to the timeline of the first information; and playing second information in the second display area, in response to the reception of the second information sent from the server, wherein the second information is information acquired by the server when the recorded video stream is played.

In a third aspect, some embodiments of the present disclosure provide an information sending apparatus, comprising:

a video stream sending module configured to send a live video stream to a first set of clients;

an information receiving module configured to receive first information sent from the first set of clients, wherein the first information is information related to the live video stream received during the sending of the live video stream;

a recording module configured to record a timestamp of the first information;

an information sending module configured to send the first information to the first set of clients;

a recorded-video-stream generating module configured to, in response to the completion of the sending of the live video stream, generate a recorded video stream of the live video stream;

a synchronizing module configured to synchronize the timestamp of the first information with the recorded video stream to obtain a play timeline of the first information;

the video stream sending module further configured to, in response to the reception of a request for the recorded video stream of a second set of clients, send the recorded video stream to the second set of clients, and send the first information according to the play timeline of the first information;

the information receiving module further configured to receive second information sent from the second set of clients, wherein the second information is information related to the recorded video stream received during the sending of the recorded video stream; and the information sending module further configured to send the second information to the second set of clients.

Further, the first set of clients is overlapped, or not overlapped, or partially overlapped with the second set of clients.

Further, the first information comprises: bullet screen information and/or comment information sent from the first set of clients, received during the sending of the live video stream.

Further, the second information comprises: bullet screen information and/or comment information sent from the second set of clients, received during the sending of the recorded video stream.

Further, the recorded-video-stream generating module is further configured to: in response to the completion of sending a last video frame of the live video stream, generate the recorded video stream of the live video stream, wherein each video frame in the recorded video stream carries a timestamp, which represents time when the video frame is generated.

Further, the synchronizing module is further configured to: synchronize the first information with the recorded video stream according to the timestamp of the first information and the timestamp of the video frame of the recorded video stream to obtain a playing time point of the first information relative to the recorded video stream.

Further, the video stream sending module is further configured to: calculate sending time of the first information according to sending time of a first video frame of the recorded video stream and the playing time point of the first information; and when the sending time is reached, send the first information.

Further, the video stream sending module is further configured to: determine first information corresponding to the video frame of the recorded video stream; and while sending the video frame to the second set of clients, send the first information to the second set of clients.

In a fourth aspect, some embodiments of the present disclosure provide an information display apparatus, comprising:

a receiving module configured to receive a recorded video stream and first information sent from a server, wherein the first information is information acquired by the server when the recorded video stream is live streamed, and the first information comprises a timeline; and a display module configured to play the recorded video stream in a first display area; play the first information in a second display area according to the timeline of the first information; and in response to the reception of second information sent from the server, play the second information in the second display area, wherein the second information is information acquired by the server when the recorded video stream is played.

In a fifth aspect, some embodiments of the present disclosure provide an electronic device, comprising:

a memory configured to store computer-readable instructions; and a processor configured to run the computer-readable instructions, so that the electronic device implements the information sending method according to any one of the above first aspect or the information display method according to the second aspect.

In a sixth aspect, some embodiments of the present disclosure provide a non-transitory computer-readable storage medium configured to store computer-readable instructions which, when executed by a computer, cause the computer to implement the information sending method according to any one of the first aspect or the information display method according to the second aspect.

In a seventh aspect, some embodiments of the present disclosure provide a computer program, comprising: instructions which, when executed by a processor, cause the processor to perform the information sending method according to any one of the first aspect or the information display method according to the second aspect.

In an eighth aspect, some embodiments of the present disclosure provide a computer program product, comprising instructions which, when executed by a processor, cause the processor to perform the information sending method according to any one of the first aspect or the information display method according to the second aspect.

The embodiments of the present disclosure disclose an information sending method, apparatus, electronic device and computer-readable storage medium. The information sending method comprises: sending a live video stream to a first set of clients; receiving first information sent from the first set of clients, wherein the first information is information related to the live video stream received during the sending of the live video stream; recording a timestamp of the first information; sending the first information to the first set of clients; in response to the completion of the sending of the live video stream, generating a recorded video stream of the live video stream; synchronizing the timestamp of the first information with the recorded video stream to obtain a play timeline of the first information; in response to the reception of a request for the recorded video stream of a second set of clients, sending the recorded video stream to the second set of clients, and sending the first information according to the play timeline of the first information; receiving second information sent from the second set of clients, wherein the second information is information related to the recorded video stream received during the sending of the recorded video stream; and sending the second information to the second set of clients.

The foregoing description is only an overview of the technical solutions of the present disclosure, and in order to enable a clearer understanding of the technical means of the present disclosure, to implement according to the content of the description, and in order to make the above and other objectives, features, and advantages of the present disclosure more understandable, preferred embodiments are provided below, and described in detail in conjunction with the accompanying drawings as follows.

BRIEF DESCRIPTION OF THE DRAWINGS

The above and other features, advantages, and aspects of the embodiments of the present disclosure will become more apparent in conjunction with the accompanying drawings and with reference to the following "DETAILED DESCRIPTION". Throughout the drawings, identical or similar reference numbers refer to identical or similar elements. It should be understood that the drawings are illustrative and that components and elements are not necessarily drawn to scale.

FIG. 2 is a schematic flow diagram of an information display method provided in some embodiments of the present disclosure;

DETAILED DESCRIPTION

Figure 1:
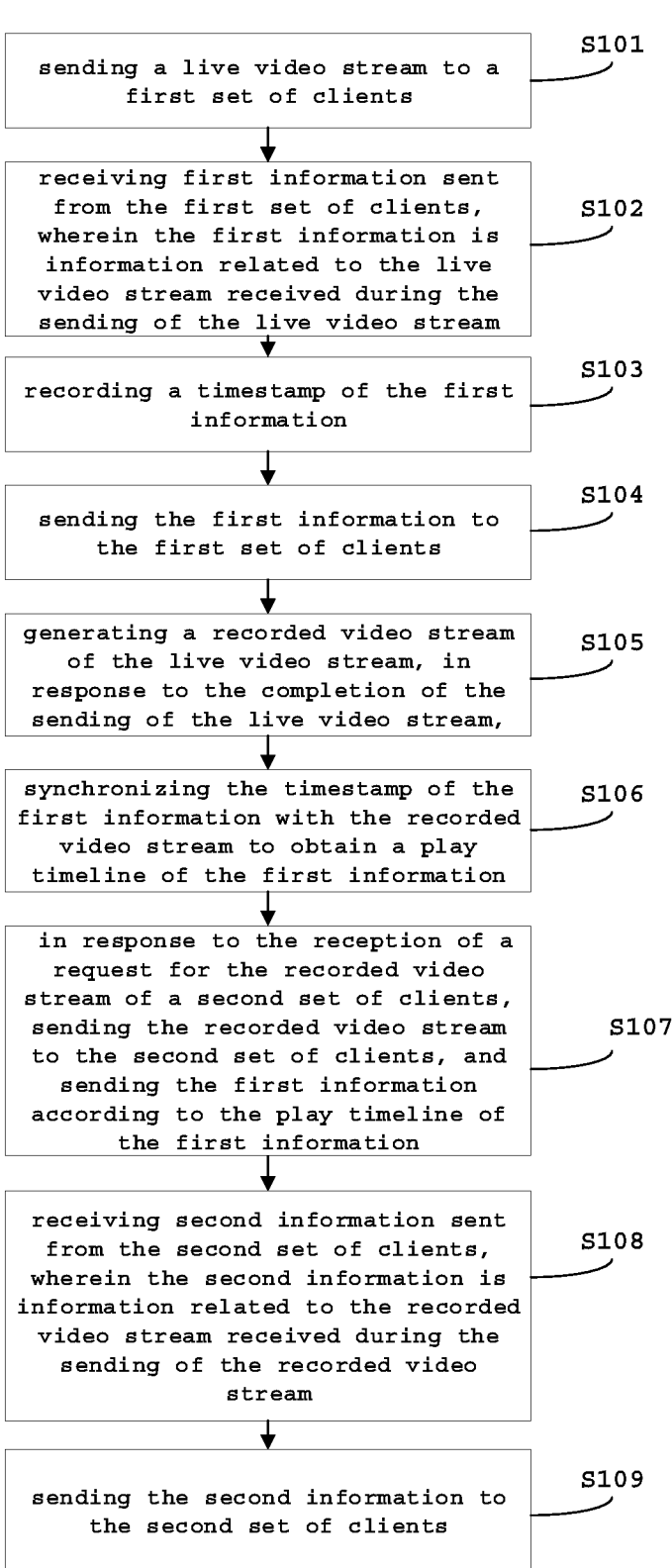
FIG. 1 is a schematic flow diagram of an information sending method provided in some embodiments of the present disclosure.

The embodiments of the present disclosure will be described in more detail below with reference to the accompanying drawings. While certain embodiments of the present disclosure are shown in the drawings, it should be understood that the present disclosure can be implemented in various forms and should not be construed as limited to the embodiments set forth herein, and rather, these embodiments are provided for a more complete and thorough understanding of the present disclosure. It should be understood that the drawings and the embodiments of the present disclosure are for exemplary purposes only and are not intended to limit the scope of the present disclosure.

It should be understood that various steps recited in method embodiments of the present disclosure may be performed in a different order, and/or performed in parallel. Moreover, the method embodiments may comprise additional steps and/or omit performing the illustrated steps. The scope of the present disclosure is not limited in this respect.

The term "comprising" and variations thereof used herein are intended to be open-ended, i.e., "comprising but not limited to". The term "based on" is "at least partially based on". The term "one embodiment" means "at least one embodiment"; the term "another embodiment" means "at least one other embodiment"; the term "some embodiments" means "at least some embodiments". Relevant definitions for other terms will be given in the following description.

It should be noted that the concepts "first", "second", and the like mentioned in the present disclosure are only used for distinguishing different devices, modules or units, and are not used for limiting the order or interdependence of functions performed by the devices, modules or units.

It should be noted that modifications of "a" or "an" mentioned in this disclosure are intended to be illustrative rather than restrictive, and that those skilled in the art should appreciate that they should be understood as "one or more" unless otherwise explicitly stated in the context.

In the related art, for a first-played video, information sent from a user cannot be saved, resulting in loss of the information. In order to solve the above technical problem and improve use experience of the user, the embodiments of the present disclosure provide the following technical solutions.

FIG. 1 is a flow diagram of an information sending method embodiment provided in some embodiments of the present disclosure, wherein the information sending method provided in this embodiment is executed by an information sending apparatus, the information sending apparatus is implemented as software, or as a combination of software and hardware, and is integrated in a certain device in an information sending system, such as in a server. As shown in FIG. 1, the method comprises the following steps:

Step S101: sending a live video stream to a first set of clients.

The first set of clients comprises at least one first client, the first client being a client used by a user viewing the live video stream. Exemplarily, if a live-streaming client creates a live-streaming room on a server, the first set of clients is clients connected to the live-streaming room, and after receiving a live video stream sent from the live-streaming client, the server sends the live video stream to each first client in the first set of clients, so that the first client plays the live video stream. It should be noted that live streaming in the embodiment of the present disclosure should be understood in a broad sense, for example, it comprises live streaming audio and video information acquired in real time in a traditional sense, and it may also comprise playing recorded audio and video information with a fixed progress (synchronously).

Step S102: receiving first information sent from the first set of clients, wherein the first information is information related to the live video stream received during the sending of the live video stream.

During the viewing of the live video stream, the user of the first client might send information to comment on the live video stream or interact with other users viewing the live video stream. In order that the first clients in the first set of clients can all receive information of other clients, the server needs to receive the information sent from the first set of clients. Exemplarily, if a user of the first client sends, during viewing of a live video stream, comment information and/or bullet screen information in a comment area and/or a bullet screen area of the live video stream, the server receives the comment information and/or the bullet screen information sent from the first client during the sending of the live video stream. It can be understood that the first information includes one or more pieces of information sent from the first set of clients.

Step S103: recording a timestamp of the first information.

The timestamp of the first information is generation time of the first information or reception time of the first information. That is, when the first information is generated, the first information is time-stamped according to system time of the client, or when the server receives the first information, the reception time is taken as the timestamp of the first information. It can be understood that time of the client and time of the server are synchronous, that is, there is no time difference between the time of the client and the time of the server.

Step S104: sending the first information to the first set of clients.

There are various manners of triggering the server sending the first information. Exemplarily, the server periodically receives a request for message of the first client in the first set of clients, and when receiving the request for message, the server parses from the request a read position of a message requested by the first client, such as a message identification of a last message requested in a previous message request, and then obtains, according to the message identification, first information received after the message identification from first information received from the server, and sends the first information to the first client in the first set of clients; or after receiving the first information, the server forwards the first information to all the first clients in the first set of clients.

Step S105: generating a recorded video stream of the live video stream, in response to the completion of the sending of the live video stream.

Before the live video stream ends, the server cannot determine a position in the live video stream of each frame in the live video stream, and therefore, when the sending of the live video stream is completed, the recorded video stream of the live video stream is generated according to stored video frames of the live video stream, so that the recorded video stream can be played later.

Alternatively, the step S105 comprises:

in response to the completion of sending a last video frame of the live video stream, generating the recorded video stream of the live video stream, wherein each video frame in the recorded video stream carries a timestamp, which represents time when the video frame is generated. Alternatively, the last video frame of the live video stream is determined by an end signal of a live-streaming, that is, it is confirmed that the sending is completed. Exemplarily, when live streaming ends, an a client of an anchor will send an end signal of a live-streaming so that the server closes a live-streaming room, and when the server receives the live-streaming end signal, a last video frame of the live video stream is determined. Therefore, all video frames of the live video stream can be obtained, a playing time difference of each frame relative to the first frame can be obtained, and thus the recorded video stream is obtained. In order to subsequently synchronize the recorded video stream with the first information, a timestamp of each frame in the live video stream is also saved in this step, which is an absolute timestamp, i.e. generation time of each frame or sending time when each frame is sent to the first client.

Step S106: synchronizing the timestamp of the first information with the recorded video stream to obtain a play timeline of the first information.

In order to save information related to the live video stream, that was acquired during the live video stream being live streamed such that the information is not lost, the saved first information is synchronized with the recorded video stream in this step.

Alternatively, the step S106 comprises:

synchronizing the first information with the recorded video stream according to the timestamp of the first information and the timestamp of the video frame of the recorded video stream to obtain a playing time point of the first information relative to the recorded video stream.

Alternatively, a time difference between the timestamp of the first information and a timestamp of a first video frame of the recorded video stream is calculated as the playing time point of the first information relative to the recorded video stream. Exemplarily, if a timestamp of first information is 20:00:10, and a timestamp of a first video frame of a recorded video stream is 20:00:00, then after the first information is synchronized with the recorded video stream, it is obtained that a playing time point of the first information relative to the recorded video stream is 10 seconds.

In some embodiments, the timestamp of the first information may also be compared with the timestamp of the video frame in the recorded video stream, and a video frame with a timestamp that is the same as that of the first information is taken as a video frame corresponding to the first information, to generate a correspondence between the video frame and the first information, so that a playing time point of the video frame is a playing time point of the first information.

The synchronization operation is performed on each first information to obtain a timeline of the first information corresponding to the recorded video stream.

It can be understood that the above manner of synchronization is merely exemplary and does not constitute a limitation on the present disclosure. Any manner capable of synchronizing the first information with the recorded video stream can be applied to the present disclosure, which will not be repeated here.

Step S107: in response to the reception of a request for the recorded video stream of a second set of clients, sending the recorded video stream to the second set of clients, and sending the first information according to the play timeline of the first information.

The second set of clients comprises at least one second client used by a user viewing the recorded video stream. Exemplarily, the second client displays recorded videos available for playing; when a user selects one of the recorded videos for playing, the server receives a request for the recorded video stream of the second client, and the server, according to an identification of a recorded video stream indicated in the request for the recorded video stream, searches for and sends a corresponding recorded video stream, while the server also searches for first information corresponding to the recorded video stream and sends the first information according to a play timeline of the first information.

The first set of clients is overlapped, or not overlapped, or partially overlapped with the second set of clients. That is, the client viewing the recorded video stream is the client viewing the live video stream, or is not the client viewing the live video stream.

In some embodiments, the sending the first information according to the play timeline of the first information comprises:

calculating sending time of the first information according to sending time of the first video frame of the recorded video stream and the playing time point of the first information; and sending the first information, till the sending time is reached.

When the server sends out the first video frame of the recorded video stream, the sending time of the first video frame is determined, and the playing time point of the first information is the playing time difference between the first information and the first video frame, thus the sending time point of the first information can be obtained by adding the playing time point to the sending time; and when the system time of the server reaches the sending time point, the first information is sent, so that playing time of the first information is the same as acquisition time of the first information in the live video stream. Exemplarily, the sending time of the first video frame of the recorded video stream is 20:00:00, and the playing time of the first information relative to the recorded video stream is 10 seconds, then it can be obtained by calculation that sending time of the first information is 20:00:10, and when the time of the server reaches 20:00:10, the first information is sent.

In some embodiments, the sending the first information according to the play timeline of the first information comprises:

determining first information corresponding to the video frame of the recorded video stream; and while sending the video frame to the second set of clients, sending the first information to the second set of clients.

As described in the above embodiments, the playing time of the first information corresponds to playing time of a certain video frame of the recorded video, so that when the recorded video is requested to be played and is played to a certain video frame, first information corresponding to the video frame is determined, and while the video frame is sent, the first information corresponding to the video frame is sent to the second set of clients.

Step S108: receiving second information sent from the second set of clients, wherein the second information is information related to the recorded video stream received during the sending of the recorded video stream.

During the viewing of the recorded video stream, a user of the second client might send information to comment on the recorded video stream or interact (non-real-time interact) with other users viewing the recorded video stream. In order that second clients in the second set of clients can all receive information of other clients, the server needs to receive the information sent from the second set of clients. Exemplarily, if a user of the second client, during viewing of a recorded video stream, sends comment information and/or bullet screen information in a comment area and/or bullet screen area of the recorded video stream, then the server receives the comment information and/or the bullet screen information sent from the second client during sending of the recorded video stream. It can be understood that the second information includes one or more pieces of information sent from the second set of clients.

After receiving the second information, the server records playing time of the second information. Since a length of the recorded video is known, the playing time of the second information is directly determined by the length of the recorded video, namely, the server can, after receiving the second information, directly calculate a timeline of the second information, without the need of waiting for completing the playing of the recorded video. After the playing time of the second information is recorded, when the recorded video stream is played again after the generation time of the second information, the second information will be, along with the recorded video, sent to a client receiving the recorded video stream.

Step S109: sending the second information to the second set of clients.

The second set of clients comprises second clients concurrently receiving the recorded video stream sent from the server, or second clients not concurrently receiving the recorded video stream sent from the server. Since the recorded video stream is not a real-time video stream, the time when the second clients view the recorded video stream is either early or late, and a second client late viewing the recorded video stream can receive second information sent from a second client early viewing the recorded video stream sent from the server and second information sent from the second client late viewing the recorded video stream himself. Therefore, the second information sent to the second set of clients includes second information received by the server before the client receiving the second information receives the recorded video stream.

Therefore, it is the recorded video stream, the first information and the second information that are sent to the second set of clients by the server, so that the first information received by the server when the live video stream is played is preserved, and while the recorded video stream is sent to the second client by the server, the first information and the second information are sent, which enables the user viewing the recorded video stream to see information sent from a viewer in any playing state of the video stream, and achieves fusion of the information received in multiple playing states of the video stream.

The embodiment of the present disclosure discloses an information sending method, which comprises: sending a live video stream to a first set of clients; receiving first information sent from the first set of clients, wherein the first information is information related to the live video stream received during the sending of the live video stream; recording a timestamp of the first information; sending the first information to the first set of clients; generating a recorded video stream of the live video stream, in response to the completion of the sending of the live video stream; synchronizing the timestamp of the first information with the recorded video stream to obtain a play timeline of the first information; sending the recorded video stream to the second set of clients, in response to the reception of a request for the recorded video stream of a second set of clients, and sending the first information according to the play timeline of the first information; receiving second information sent from the second set of clients, wherein the second information is information related to the recorded video stream received during the sending of the recorded video stream; and sending the second information to the second set of clients. With the above method, messages sent from the user during the live streaming of the video stream can be saved, and when the user requests playing the recorded video stream, the messages sent during the live streaming and the messages sent during the recording and playing are fused, so that the problem of information loss is solved.

FIG. 2 is a flow diagram of an information display method embodiment provided in some embodiments of the present disclosure, wherein the information display method provided in some embodiments is executed by an information display apparatus, and the information display apparatus is implemented as software, or as a combination of software and hardware, and is integrated in a certain device in an information display system, such as in a terminal device. As shown in FIG. 2, the method comprises the following steps.

step S201, receiving a recorded video stream and first information sent from a server, wherein the first information is information acquired by the server when the recorded video stream is live streamed, and the first information comprises a timeline.

The steps shown in FIG. 2 are performed by a client in the terminal device, i.e. the second client in the above embodiment. In some embodiments, before the step S201, the client sends a video stream playing request, and thereafter, the client receives the recorded video stream and the first information sent from the server, wherein the first information, as described above, is information received by the server when the recorded video stream is live streamed, for example, comment information in a comment area and/or bullet screen information in a bullet screen area that are sent from a user in the live streaming, and the like, wherein the live streaming refers to a process that the live video stream for generating the recorded video stream is live streamed. The first information further comprises the timeline, i.e. a playing time point of the first information.

Step S202: playing the recorded video stream in a first display area.

The first display area is an area of the client on the terminal device for displaying the video stream. After receiving the video stream, the client renders a picture in the display area, through decoding, to play the recorded video stream.

Step S203, playing the first information in a second display area according to the timeline of the first information.

The second display area is overlapped, or partially overlapped, or not overlapped with the first display area. Exemplarily, the second display area is a portion of the first display area, for example, the first display area is a rectangle, and the second display area is a top ¼ rectangle portion of the first display area. In the second display area, the first information is played according to the timeline of the first information. For example, the timeline of the first information is 20:00:10, then the first information is played when the time of the client reaches the time; a display duration of the first information is preset to a time length or a number of frames of the recorded video stream, for example, a display duration of the first information is 5 seconds, and the first information automatically disappears after 5 seconds, or a display duration of the first information is 150 frames, and the first information automatically disappears after 150 frames starting from the display of the first information.

Step S204, in response to the reception of second information sent from the server, playing the second information in the second display area, wherein the second information is information acquired by the server when the recorded video stream is played.

While the recorded video stream and the first information are sent, the client also receives the second information sent from the server, and plays the second information in the second display area. The second information is information acquired when the recorded video stream is played, and the second information may be real-time information sent from the client, for example, a user of the client sends second information when viewing the recorded video stream, then the server will send the second information back to the client, and then the client displays the second information in the second display area; the second information may also be, before a user of the client views the recorded video, historical second information sent from a user of another client when viewing the recorded video, and at this time, the second information is, like the above first information, displayed in the second display area according to the timeline.

Therefore, the user can, when viewing the recorded video stream through the client, concurrently view the information sent from other users during the recorded video stream is live streamed and played, thereby solving the problem that the information sent from the user in the live streaming cannot be saved.

Figure 3:
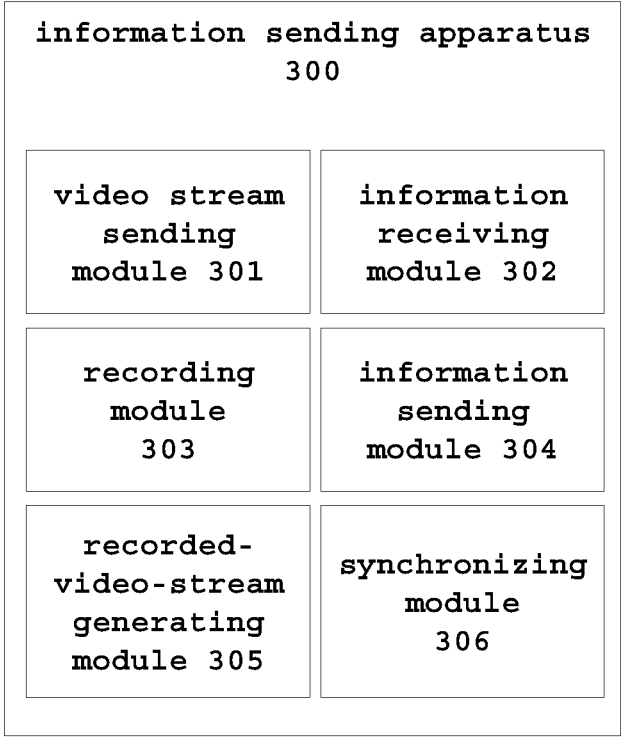
FIG. 3 is a schematic structural diagram of some embodiments of an information sending apparatus provided in some embodiments of the present disclosure.

FIG. 3 is a schematic structural diagram of an information sending apparatus embodiment provided in some embodiments of the present disclosure. As shown in FIG. 3, the apparatus 300 comprises: a video stream sending module 301, an information receiving module 302, a recording module 303, an information sending module 304, a recorded-video-stream generating module 305 and a synchronizing module 306.

The video stream sending module 301 is configured to send a live video stream to a first set of clients.

The information receiving module 302 is configured to receive first information sent from the first set of clients, wherein the first information is information related to the live video stream received during the sending of the live video stream.

The recording module 303 is configured to record a timestamp of the first information.

The information sending module 304 is configured to send the first information to the first set of clients.

The recorded-video-stream generating module 305 is configured to, generate a recorded video stream of the live video stream, in response to the completion of the sending of the live video stream.

The synchronizing module 306 is configured to synchronize the timestamp of the first information with the recorded video stream to obtain a play timeline of the first information.

The video stream sending module 301 is further configured to, in response to the reception of a request for the recorded video stream of a second set of clients, send the recorded video stream to the second set of clients, and send the first information according to the play timeline of the first information.

The information receiving module 302 is further configured to receive second information sent from the second set of clients, wherein the second information is information related to the recorded video stream received during the sending of the recorded video stream.

The information sending module 304 is further configured to send the second information to the second set of clients.

Further, the first set of clients is overlapped, or not overlapped, or partially overlapped with the second set of clients.

Further, the first information comprises: bullet screen information and/or comment information sent from the first set of clients, received during the sending of the live video stream.

Further, the second information comprises: bullet screen information and/or comment information sent from the second set of clients, received during the sending of the recorded video stream.

Further, the recorded-video-stream generating module is further configured to: sending a last video frame of the live video stream, generate the recorded video stream of the live video stream, in response to the completion of, wherein each video frame in the recorded video stream carries a time-stamp, which represents time when the video frame is generated.

Further, the synchronizing module 306 is further configured to: synchronize the first information with the recorded video stream according to the timestamp of the first information and the timestamp of the video frame of the recorded video stream to obtain a playing time point of the first information relative to the recorded video stream.

Further, the video stream sending module 301 is further configured to: calculate sending time of the first information according to sending time of a first video frame of the recorded video stream and the playing time point of the first information; and send the first information till the sending time is reached.

Further, the video stream sending module 301 is further configured to: determine first information corresponding to the video frame of the recorded video; and while sending the video frame to the second set of clients, send the first information to the second set of clients.

The apparatus shown in FIG. 3 can execute the method of the embodiment shown in FIG. 1, and for a part of this embodiment that is not described in detail, reference is made to the related description of the embodiment shown in FIG. 1. For the execution process and technical effect of the technical solution, reference is made to the description in the embodiment shown in FIG. 1, which is not repeated here.

Figure 4:
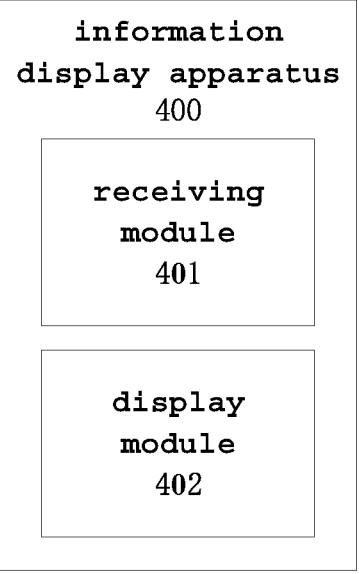
FIG. 4 is a schematic structural diagram of some embodiments of an information display apparatus provided in some embodiments of the present disclosure.

FIG. 4 is a schematic structural diagram of an information display apparatus embodiment provided in some embodiments of the present disclosure. As shown in FIG. 4, the apparatus 400 comprises: a receiving module 401 and a display module 402. The receiving module 401 is configured to receive a recorded video stream and first information sent from a server, wherein the first information is information acquired by the server when the recorded video stream is live streamed, and the first information comprises a timeline; and The display module 402 is configured to play the recorded video stream in a first display area; play the first information in a second display area according to the timeline of the first information; and in response to the reception of second information sent from the server, play the second information in the second display area, wherein the second information is information acquired by the server when the recorded video stream is played.

The apparatus shown in FIG. 4 can execute the method of the embodiment shown in FIG. 2, and for a part of this embodiment that is not described in detail, reference is made to the related description of the embodiment shown in FIG. 2. For the execution process and technical effect of the technical solution, reference is made to the description in the embodiment shown in FIG. 2, which is not repeated here.

The modules described above is implemented as software components executed on one or more general-purpose processors, or as hardware executing certain functions or combinations thereof, such as a programmable logic device and/or application specific integrated circuit. In some embodiments, these modules are embodied in a form of a software product, wherein the software product is stored in non-volatile storage media including instructions that cause a computer device (e.g., a personal computer, server, network device, mobile terminal, etc.) to implement the method described in the embodiment of the present disclosure. In other embodiments, the above modules are also be implemented on a single device or distributed on a plurality of devices. Functions of these modules are combined with each other, or further divided into a plurality of sub-modules.

Figure 5:
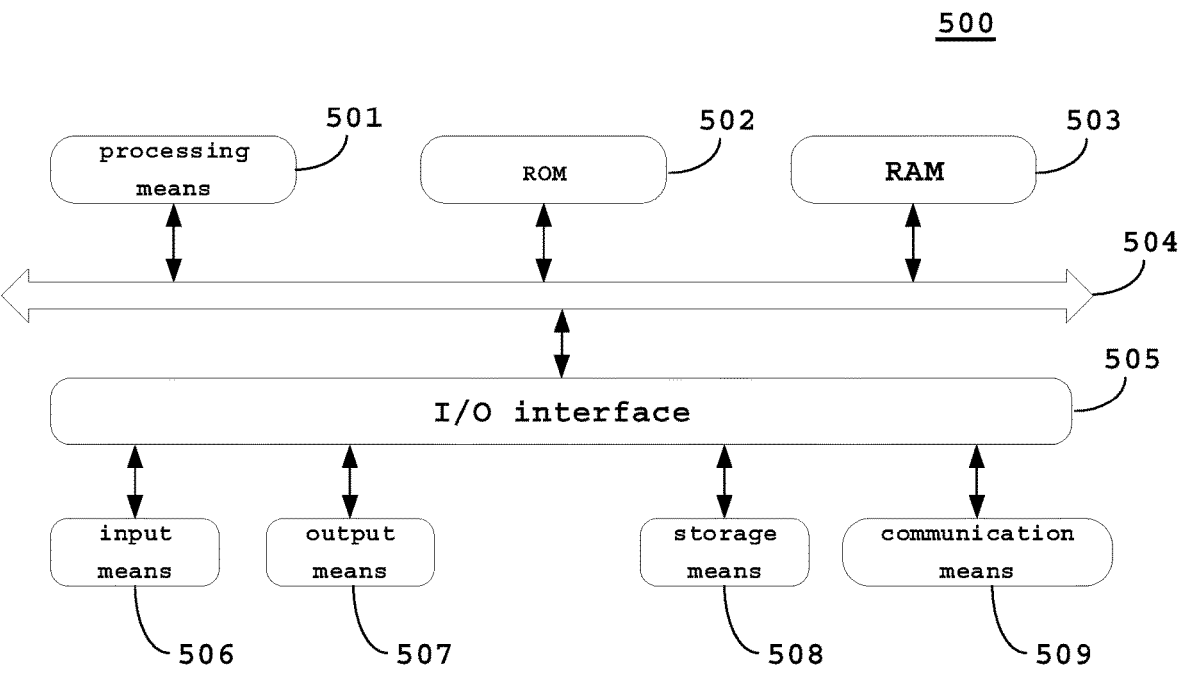
FIG. 5 is a schematic structural diagram of an electronic device provided in some embodiments of the present disclosure.

Reference is made below to FIG. 5, which shows a schematic structural diagram of an electronic device 500 suitable for implementing some embodiments of the present disclosure. The terminal device in the embodiments of the present disclosure is include, but is not limited to, a mobile terminal such as a mobile phone, a notebook computer, a digital broadcast receiver, a PDA (Personal Digital Assistant), a PAD (tablet computer), a PMP (Portable Multimedia Player), and a vehicle-mounted terminal (e.g., a vehicle-mounted navigation terminal), and a fixed terminal such as a digital TV, and a desktop computer. The electronic device shown in FIG. 5 is only an example, and should not bring any limitation to the functions and the scope of use of the embodiments of the present disclosure.

As shown in FIG. 5, the electronic device 500 comprises a processing means (e.g., a central processing unit, graphics processing unit, etc.) 501, which performs various appropriate actions and processes according to a program stored in a read-only memory (ROM) 502 or a program loaded from a storage means 508 into a random access memory (RAM) 503. In the RAM 503, various programs and data necessary for the operation of the electronic device 500 are also stored. The processing means 501, the ROM 502, and the RAM 503 are connected to each other through a communication line 504. An input/output (I/O) interface 505 is also connected to the communication line 504.

Generally, the following means are connected to the I/O interface 505: an input means 506 including, for example, a touch screen, touch pad, keyboard, mouse, camera, microphone, accelerometer, gyroscope, etc.; an output means 507 including, for example, a liquid crystal display (LCD), a speaker, a vibrator, etc.; the storage means 508 including, for example, a magnetic tape, hard disk, etc.; and a communication means 509. The communication means 509 allows the electronic device 500 to communicate with other devices wirelessly or by wire to exchange data. While FIG. 5 illustrates the electronic device 500 having various means, it should be understood that not all illustrated means are required to be implemented or provided. More or fewer means are alternatively implemented or provided.

In particular, according to the embodiments of the present disclosure, the process described above with reference to the flow diagram is implemented as a computer software program. For example, some embodiments of the present disclosure comprise a computer program product which comprises a computer program carried on a non-transitory computer-readable medium, the computer program containing program code for performing the method illustrated by the flow diagram. In such embodiments, the computer program is downloaded and installed from a network through the communication means 509, or installed from the storage means 508, or installed from the ROM 502. The computer program, when executed by the processing means 501, performs the above functions defined in the method of the embodiments of the present disclosure.

It should be noted that the above computer-readable medium of the present disclosure is a computer-readable signal medium or a computer-readable storage medium or any combination of the two. The computer-readable storage medium is, for example, but not limited to, an electronic, magnetic, optical, electromagnetic, infrared, or semiconductor system, apparatus, or device, or any combination of the above. More specific examples of the computer-readable storage medium include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the computer-readable storage medium is any tangible medium containing or storing a program which can be used by or in conjunction with an instruction execution system, apparatus, or device. However, in the present disclosure, the computer-readable signal medium includes a data signal propagated in baseband or as part of a carrier wave, in which computer-readable program code is carried. Such a propagated data signal takes a variety of forms, including, but not limited to, electromagnetic signals, optical signals, or any suitable combination of the above. The computer-readable signal medium is any computer-readable medium other than the computer-readable storage medium, which can send, propagate, or transmit a program for use by or in conjunction with an instruction execution system, apparatus, or device. The program code contained on the computer-readable medium is transmitted using any appropriate medium, including but not limited to: wires, optical cables, RF (radio frequency), etc., or any suitable combination of the above.

In some implementations, a client and a server communicate using any currently known or future developed network protocol, such as HTTP (HyperText Transfer Protocol), and are interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium is contained in the above electronic device; or exists separately without being assembled into the electronic device.

The above computer-readable medium has thereon carried one or more programs which, when executed by the electronic device, cause the electronic device to: perform the information sending method in the above embodiment.

Computer program code for performing operations of the present disclosure is written in one or more programming languages or a combination thereof. The above programming language includes, but is not limited to, an object-oriented programming language such as Java, Smalltalk, and C++, and further includes a conventional procedural programming language such as the "C" language or a similar programming language. The program code is executed entirely on a user's computer, partly on the user's computer, as a stand-alone software package, partly on the user's computer and partly on a remote computer, or entirely on the remote computer or server. In a scenario where the remote computer is involved, the remote computer is connected to the user's computer through any type of network, including a local area network (LAN) or a wide area network (WAN), or connected to an external computer (for example, through the Internet using an Internet service provider).

Some embodiments of the present disclosure provide a computer program, comprising: instructions, which when executed by a processor, cause the processor to perform the information sending method or the information display method described in any of the above embodiments.

Some embodiments of the present disclosure provide a computer program product comprising instructions which, when executed by a processor, cause the processor to perform the information sending method or the information display method described in any of the above embodiments.

The flow diagrams and block diagrams in the drawings illustrate the possibly implemented architecture, functions, and operations of the systems, methods and computer program products according to various embodiments of the present disclosure. In this regard, each block in the flow diagram or block diagram represents one module, program segment, or part of code, which contains one or more executable instructions for implementing specified logical functions. It should also be noted that, in some alternative implementations, the functions noted in the blocks also occur in a different order from those noted in the drawings. For example, two blocks shown in succession are, in fact, be executed substantially concurrently, and they are sometimes executed in a reverse order, which depends upon functions involved. It will also be noted that each block of the block diagrams and/or flow diagrams, and a combination of blocks in the block diagrams and/or flow diagrams, can be implemented by a special-purpose hardware-based system that performs the specified functions or operations, or by a combination of special-purpose hardware and computer instructions.

The involved modules described in the embodiment of the present disclosure are implemented by software or hardware. The name of the module, in some cases, does not constitute a limitation on the module itself.

The functions described above herein are at least partially executed by one or more hardware logic components. For example, without limitation, an exemplary type of hardware logic components that are used includes: a field programmable gate array (FPGA), application specific integrated circuit (ASIC), application specific standard product (ASSP), system on chip (SOC), complex programmable logic device (CPLD), and the like.

In the context of this disclosure, a machine-readable medium is a tangible medium, which contains or store a program for use by or in conjunction with an instruction execution system, apparatus, or device. The machine-readable medium is a machine-readable signal medium or a machine-readable storage medium. The machine-readable medium includes, but is not limited to, an electronic, magnetic, optical, electromagnetic, infrared, or semiconductor system, apparatus, or device, or any suitable combination of the above. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

According to one or more embodiments of the present disclosure, there is provided an electronic device, comprising: at least one processor; and a memory in communication connection with the at least one processor, wherein the memory has thereon stored instructions executable by the at least one processor, and the instructions are executed by the at least one processor to enable the at least one processor to perform any of the information sending methods in the foregoing first aspect.

According to one or more embodiments of the present disclosure, there is provided a non-transitory computer-readable storage medium, which has thereon stored computer instructions for causing a computer to perform any of the information sending methods in the foregoing first aspect.

The foregoing description is only the preferred embodiments of the present disclosure and an explanation of the technical principles employed. It should be appreciated by those skilled in the art that the disclosure scope involved in the present disclosure is not limited to the technical solutions formed by specific combinations of the technical features described above, but also encompasses other technical solutions formed by arbitrary combinations of the above technical features or equivalent features thereof without departing from the above disclosed concepts. For example, a technical solution formed by performing mutual replacement between the above features and technical features having similar functions to those disclosed (but not limited to) in the present disclosure.

What is claimed is:

1. An information sending method, comprising:

sending a live video stream to a first set of clients;

receiving first information sent from the first set of clients, wherein the first information is information related to the live video stream received during the sending of the live video stream;

recording a timestamp of the first information;

sending the first information to the first set of clients;

generating a recorded video stream of the live video stream, in response to completion of the sending of the live video stream;

synchronizing the timestamp of the first information with the recorded video stream to obtain a playback timeline of the first information;

in response to reception of a request for the recorded video stream from a second set of clients, sending the recorded video stream to the second set of clients, and sending the first information according to the play timeline of the first information;

receiving second information sent from the second set of clients, wherein the second information is information related to the recorded video stream received during the sending of the recorded video stream, and the second information comprises: bullet screen information and/ or comment information sent from the second set of clients, received during the sending of the recorded video stream; and sending the second information to the second set of clients, wherein the generating the recorded video stream of the live video stream, in response to the completion of the sending of the live video stream, comprises: generating the recorded video stream of the live video stream, in response to the completion of sending a last video frame of the live video stream, wherein each video frame in the recorded video stream carries a timestamp, which represents time when the video frame is generated;

wherein the synchronizing the timestamp of the first information with the recorded video stream to obtain the play timeline of the first information, comprises: synchronizing the first information with the recorded video stream according to the timestamp of the first information and the timestamp of the video frame of the recorded video stream, to obtain a playing time point of the first information relative to the recorded video stream;

wherein the synchronizing the first information with the recorded video stream according to the timestamp of the first information and the timestamp of the video frame of the recorded video stream to obtain the playing time point of the first information relative to the recorded video stream, comprises: calculating a time difference between the timestamp of the first information and a timestamp of a first video frame of the recorded video stream, as the playing time point of the first information relative to the recorded video stream.

2. The information sending method according to claim 1, wherein the first set of clients is overlapped, or not overlapped, or partially overlapped with the second set of clients.

3. The information sending method according to claim 1, wherein the first information comprises: bullet screen information and/or comment information, sent from the first set of clients and received during the sending of the live video stream.

4. The information sending method according to claim 1, wherein the sending the first information according to the play timeline of the first information, comprises:

calculating sending time of the first information according to sending time of the first video frame of the recorded video stream and the playing time point of the first information; and sending the first information till the sending time is reached.

5. The information sending method according to claim 4, wherein the sending the first information according to the play timeline of the first information, comprises:

determining the first information corresponding to the video frame of the recorded video; and while sending the video frame to the second set of clients, sending the first information to the second set of clients.

6. An electronic device, comprising:

a memory configured to store computer-readable instructions; and a processor configured to run the computer-readable instructions, so that the electronic device implements the information sending method according to claim 1.

7. A non-transitory computer-readable storage medium configured to store computer-readable instructions which, when executed by a computer, cause the computer to implement an information sending method comprising:

sending a live video stream to a first set of clients;

receiving first information sent from the first set of clients, wherein the first information is information related to the live video stream received during the sending of the live video stream;

recording a timestamp of the first information;

sending the first information to the first set of clients;

generating a recorded video stream of the live video stream, in response to completion of the sending of the live video stream;

synchronizing the timestamp of the first information with the recorded video stream to obtain a playback timeline of the first information;

in response to reception of a request for the recorded video stream from a second set of clients, sending the recorded video stream to the second set of clients, and sending the first information according to the play timeline of the first information;

receiving second information sent from the second set of clients, wherein the second information is information related to the recorded video stream received during the sending of the recorded video stream, and the second information comprises: bullet screen information and/ or comment information sent from the second set of clients, received during the sending of the recorded video stream; and sending the second information to the second set of clients, wherein the generating the recorded video stream of the live video stream, in response to the completion of the sending of the live video stream, comprises: generating the recorded video stream of the live video stream, in response to the completion of sending a last video frame of the live video stream, wherein each video frame in the recorded video stream carries a timestamp, which represents time when the video frame is generated;

wherein the synchronizing the timestamp of the first information with the recorded video stream to obtain the play timeline of the first information, comprises: synchronizing the first information with the recorded video stream according to the timestamp of the first information and the timestamp of the video frame of the recorded video stream, to obtain a playing time point of the first information relative to the recorded video stream;

wherein the synchronizing the first information with the recorded video stream according to the timestamp of the first information and the timestamp of the video frame of the recorded video stream to obtain the playing time point of the first information relative to the recorded video stream, comprises: calculating a time difference between the timestamp of the first information and a timestamp of a first video frame of the recorded video stream, as the playing time point of the first information relative to the recorded video stream.

8. The non-transitory computer-readable storage medium according to claim 7, wherein the first set of clients is overlapped, or not overlapped, or partially overlapped with the second set of clients.

9. The non-transitory computer-readable storage medium according to claim 7, wherein the first information comprises: bullet screen information and/or comment information, sent from the first set of clients and received during the sending of the live video stream.

10. The non-transitory computer-readable storage medium according to claim 7, wherein the sending the first information according to the play timeline of the first information, comprises:

calculating sending time of the first information according to sending time of the first video frame of the recorded video stream and the playing time point of the first information; and sending the first information till the sending time is reached.

11. The non-transitory computer-readable storage medium according to claim 10, wherein the sending the first information according to the play timeline of the first information, comprises:

determining the first information corresponding to the video frame of the recorded video; and while sending the video frame to the second set of clients, sending the first information to the second set of clients.

* * * * *